United States Patent
Dyle (10) Patent No.: US 9,616,817 B2
(45) Date of Patent: Apr. 11, 2017

(54) SILICONE STORAGE ASSEMBLY FOR A VEHICLE

(71) Applicant: GM GLOBAL TECHNOLOGY OPERATIONS LLC, Detroit, MI (US)

(72) Inventor: Taryn Dyle, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 14/704,331

(22) Filed: May 5, 2015

(65) Prior Publication Data

US 2016/0325688 A1 Nov. 10, 2016

(51) Int. Cl.
*B60R 7/00* (2006.01)
*B60R 7/04* (2006.01)

(52) U.S. Cl.
CPC .................... *B60R 7/046* (2013.01)

(58) Field of Classification Search
CPC ...................................... B60R 7/046
USPC ........................ 296/37.8, 37.13, 37.15, 24.34
See application file for complete search history.

(56) References Cited

U.S. PATENT DOCUMENTS

| | | | |
|---|---|---|---|
| 5,474,272 A * | 12/1995 | Thompson | A47C 7/68 248/311.2 |
| 6,863,200 B2 * | 3/2005 | Beglau | B60N 3/102 224/482 |
| 8,905,456 B2 * | 12/2014 | Gaudig | B60N 3/108 296/1.07 |

* cited by examiner

*Primary Examiner* — Joseph D Pape
(74) *Attorney, Agent, or Firm* — Quinn IP Law (57) ABSTRACT

A storage assembly for a vehicle includes a flexible, silicone wall portion having a first edge and a second edge. A first hinge support rotatably supports the first edge of the wall portion for rotation about a first axis. A second hinge support rotatably supports the second edge of the wall portion for rotation about a second axis. The wall portion is rotatable relative to the first hinge support about the first axis in a first rotational direction, and is rotatable relative to the second hinge support about the second axis in a second rotational direction, between a stowed position and a deployed position. When disposed in the stowed position, the wall portion is positioned adjacent a trim panel. When disposed in the deployed position, the wall portion is positioned away from the trim panel to support a container between the wall portion and the interior trim panel.

18 Claims, 6 Drawing Sheets

SILICONE STORAGE ASSEMBLY FOR A VEHICLE

TECHNICAL FIELD

The disclosure generally relates to a storage assembly for an interior passenger compartment of a vehicle.

BACKGROUND

Passenger vehicles typically include a storage assembly for supporting various different items, such as a beverage container, a cup, a bottle, a phone, a remote control, a notepad, etc. Often, the storage assembly is moveable between a stowed position when not needed, and a deployed position for supporting the object.

SUMMARY

A vehicle is provided. The vehicle includes an interior trim panel, and a storage assembly attached to the panel. The storage assembly includes a flexible wall portion having a first edge and a second edge. A first hinge support interconnects the panel and the flexible wall portion. The first hinge support rotatably supports the first edge of the flexible wall portion for rotation about a first axis. A second hinge support interconnects the panel and the flexible wall portion. The second hinge support rotatably supports the second edge of the flexible wall portion for rotation about a second axis. The flexible wall portion is rotatable relative to the first hinge support about the first axis and the second hinge support about the second axis, between a stowed position and a deployed position. When disposed in the stowed position, the flexible wall portion is positioned adjacent the panel. When disposed in the deployed position, the flexible wall portion is positioned away from the panel to support a container between the flexible wall portion and the panel.

A storage assembly for a vehicle is also provided. The storage assembly includes a flexible wall portion having a first vertical edge and a second vertical edge. The flexible wall portion is formed from a flexible, silicone based material. A first core portion is attached to the flexible wall portion adjacent the first edge of the flexible wall portion. A second core portion is attached to the flexible wall portion adjacent the second edge of the flexible wall portion. The first core portion and the second core portion are each formed from a substantially rigid polymer material. A first hinge support is attached to the first core portion, and rotatably supports the first edge of the flexible wall portion for rotation about a first axis. The first hinge support is configured for attachment to an interior trim panel of the vehicle. A second hinge support is attached to the second core portion, and rotatably supports the second edge of the flexible wall portion for rotation about a second axis. The second hinge support is configured for attachment to the interior trim panel. The flexible wall portion is rotatable relative to the first hinge support about the first axis and the second hinge support about the second axis, between a stowed position and a deployed position. The flexible wall portion is positioned adjacent the interior trim panel when disposed in the stowed position, and is positioned away from the interior trim panel to support a container between the flexible wall portion and the interior trim panel when disposed in the deployed position.

Accordingly, the storage assembly may be attached to the trim panel, such as but not limited to a trim panel for either a B-pillar or a C-pillar of the vehicle. When not needed, the storage assembly may be positioned in the stowed position, and not interfere with ingress and/or egress from an interior passenger compartment of the vehicle. When needed to support an item/object, the storage assembly may be moved into the deployed position to support the container.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any style and/or configuration of vehicle 20, such as but not limited to a sedan, SUV, van, truck, tractor, boat, airplane, etc. The vehicle 20 includes a panel 22. Preferably, the panel 22 includes an interior trim panel 22, and is disposed within an interior passenger space of the vehicle 20. Preferably, the panel 22 is generally positioned in a substantially vertical orientation, such that the panel 22 extends in a generally vertical direction relative to a ground surface. For example, the panel 22 may be attached to one of a B-pillar or a C-pillar of the vehicle 20.

A storage assembly 24 is attached to the panel 22. The storage assembly 24 is positionable in a stowed position when in use, and a deployed position for supporting an object or item, such as a beverage container, a can, a bottle, a cup, a phone, a remote control, a notepad, etc. The storage assembly 24 includes a flexible wall portion 26 having a first edge 28, a second edge 30, a top edge 32, and a bottom edge 34. The first edge 28 and the second edge 30 extend in a generally vertical direction relative to the ground surface, and are generally parallel with the panel 22 and each other. The top edge 32 and the bottom edge 34 extend generally horizontally relative to the ground surface, between the first edge 28 and the second edge 30. Preferably, the flexible wall portion 26 is manufactured and/or formed from a flexible, silicone based material. However, the flexible wall portion 26 may be manufactured from some other flexible material capable of supporting the container, as well as capable of repeated oscillation between the deployed position shown in FIGS. 2 and 3, and the stowed position, shown in FIGS. 4 and 5.

The storage assembly 24 includes a first core portion 36 and a second core portion 38. The first core portion 36 is attached to the flexible wall portion 26, adjacent the first edge 28 of the flexible wall portion 26. The second core portion 38 is attached to the flexible wall portion 26, adjacent the second edge 30 of the flexible wall portion 26. The first core portion 36 and the second core portion 38 may include a substantially plate like structure 52. Preferably, the first core portion 36 and the second core portion 38 are each manufactured and/or formed from a substantially rigid polymer, such as a plastic or nylon material. However, it should be appreciated that the first core portion 36 and the second core portion 38 may be formed from some other material or combination of materials capable of supporting the flexible wall portion 26 when deployed to support the container. For example, the first core portion 36 and the second core portion 38 may alternatively be manufactured from a metal or some other similar, rigid material. Preferably, the flexible wall portion 26 is over-molded onto each of the first core portion 36 and the second core portion 38. However, it should be appreciated that the flexible wall portion 26 may be attached to the first core portion 36 and the second core portion 38 in some other manner, such as but not limited to an adhesive or a plurality of fasteners.

A first hinge support 40 interconnects the panel 22 and the first core portion 36. Accordingly, the first core portion 36 interconnects the first hinge support 40 and the flexible wall portion 26. The first hinge support 40 rotatably supports the first core portion 36, and thereby the first edge 28 of the flexible wall portion 26, for rotation about a first axis 42. A second hinge support 44 interconnects the panel 22 and the second core portion 38. Accordingly, the second core portion 38 interconnects the second hinge support 44 and the flexible wall portion 26. The second hinge support 44 rotatably supports the second core portion 38, and thereby the second edge 30 of the flexible wall portion 26, for rotation about a second axis 46.

The first hinge support 40 and the first core portion 36 may be configured in any suitable manner to provide a hinged connection therebetween. For example, and as shown in FIG. 1-5, the first core portion 36 defines an elongated passage 48, and the hinge support includes an elongated rod 50 extending through the elongated passage 48. A longitudinal, central axis of the elongated rod 50 defines the first axis 42. The elongated rod 50 is attached to and supported by a structure 52 that is attached to the panel 22. The elongated passage 48 of the first core portion 36 is capable of rotating about or around the elongated rod 50 of the first hinge support 40. The second hinge support 44 and the second core portion 38 may be configured in the same manner.

Figure 6:
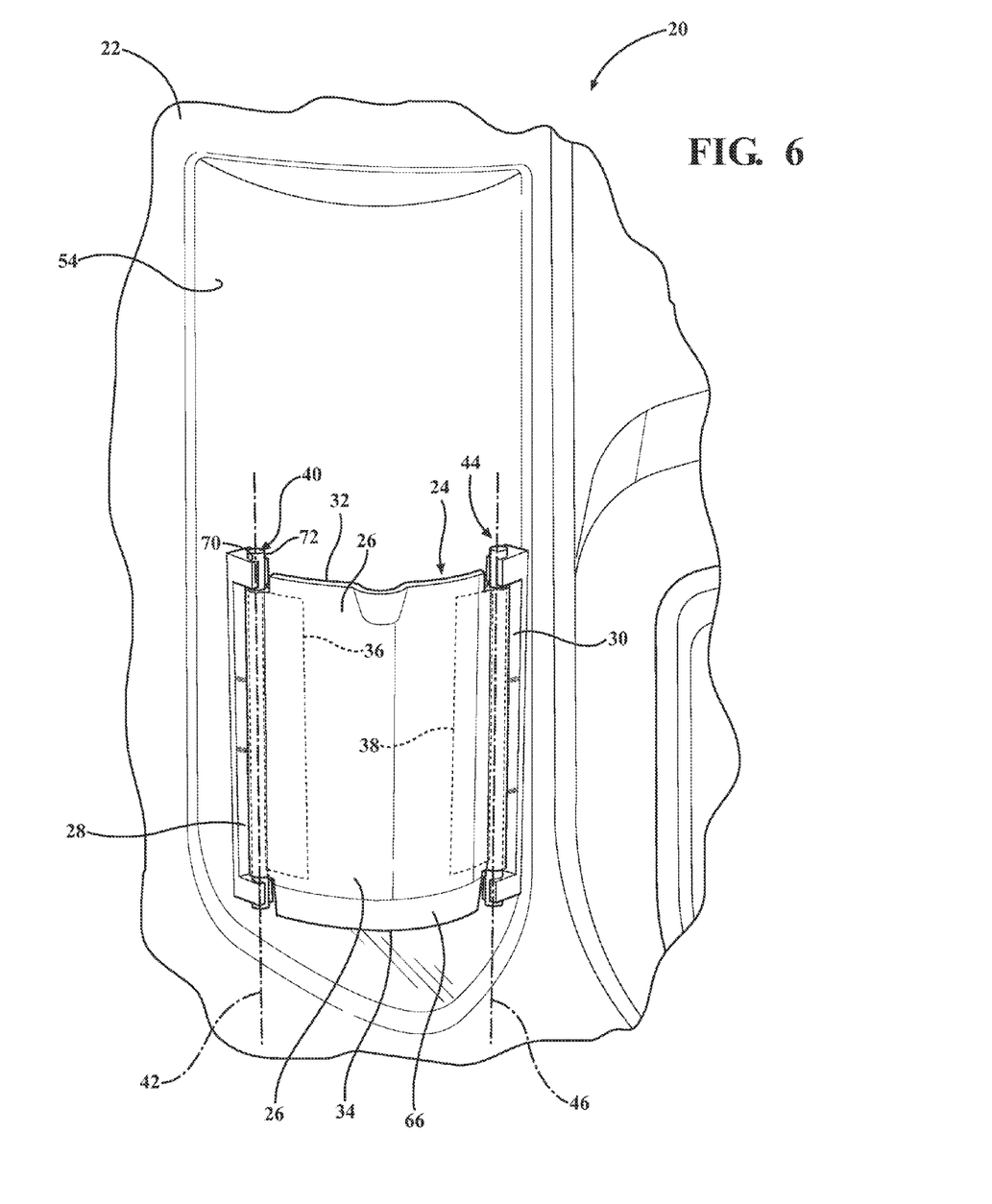
FIG. 6 is a schematic perspective view of an alternative embodiment of the storage assembly in the deployed position.

Referring to FIG. 6, an alternative embodiment of the storage assembly 24, showing a different connection configuration between the first hinge support 40 and the first core portion 36, and the second hinge support 44 and the second core portion 38, is generally shown. Within FIG. 6, the first core portion 36 and the second core portion 38 each include an elongated cylindrical portion 72, having an upper end and a lower end. The elongated cylindrical portion 72 of the first core portion 36 defines the first axis 42, and the elongated cylindrical portion 72 of the second core portion 38 defines the second axis 46. Each of the first hinge support 40 and the second hinge support 44 include a pair of vertically separated, semi-circular notches 70. The upper and lower ends of the cylindrical portions 72 are disposed in a snap fit connection with the semi-circular notches 70 of their respective first hinge support 40 and second hinge support 44. The snap fit connection between the cylindrical portions 72 and the semi-circular notches 70 allows the first core portion 36 and the second core portion 38 to rotate about their respective first axis 42 and second axis 46.

It should be appreciated that the hinged connection between the first hinge support 40 and the first core portion 36, and between the second hinge support 44 and the second core portion 38, may be different than shown and described herein, so long as the first core portion 36 and the second core portion 38 are capable of rotating about the first axis 42 and the second axis 46 respectively, relative to the first hinge support 40 and the second hinge support 44 respectively.

Figure 3:
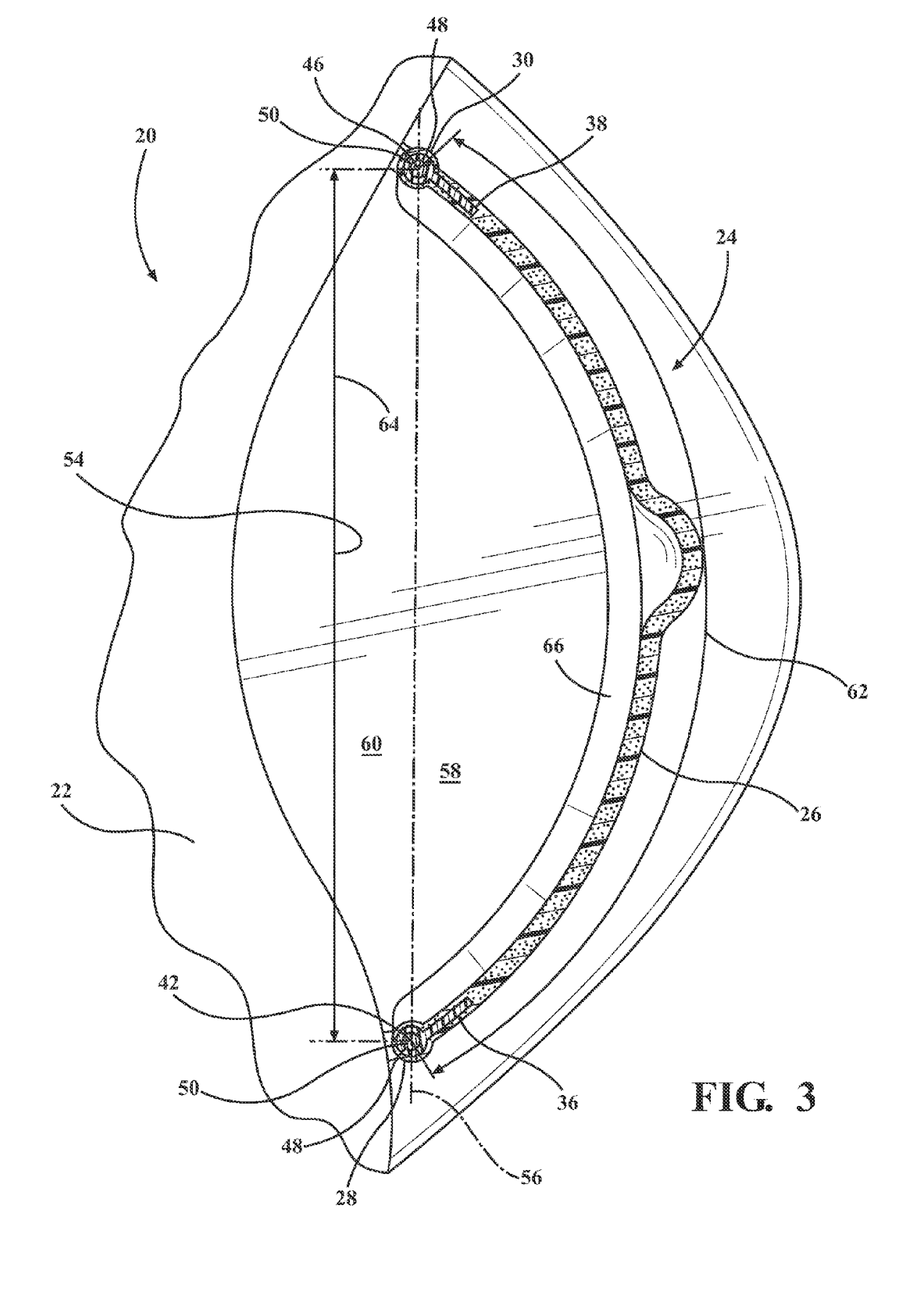
FIG. 3 is a schematic cross sectional view of the storage assembly in the deployed position.
Figure 4:
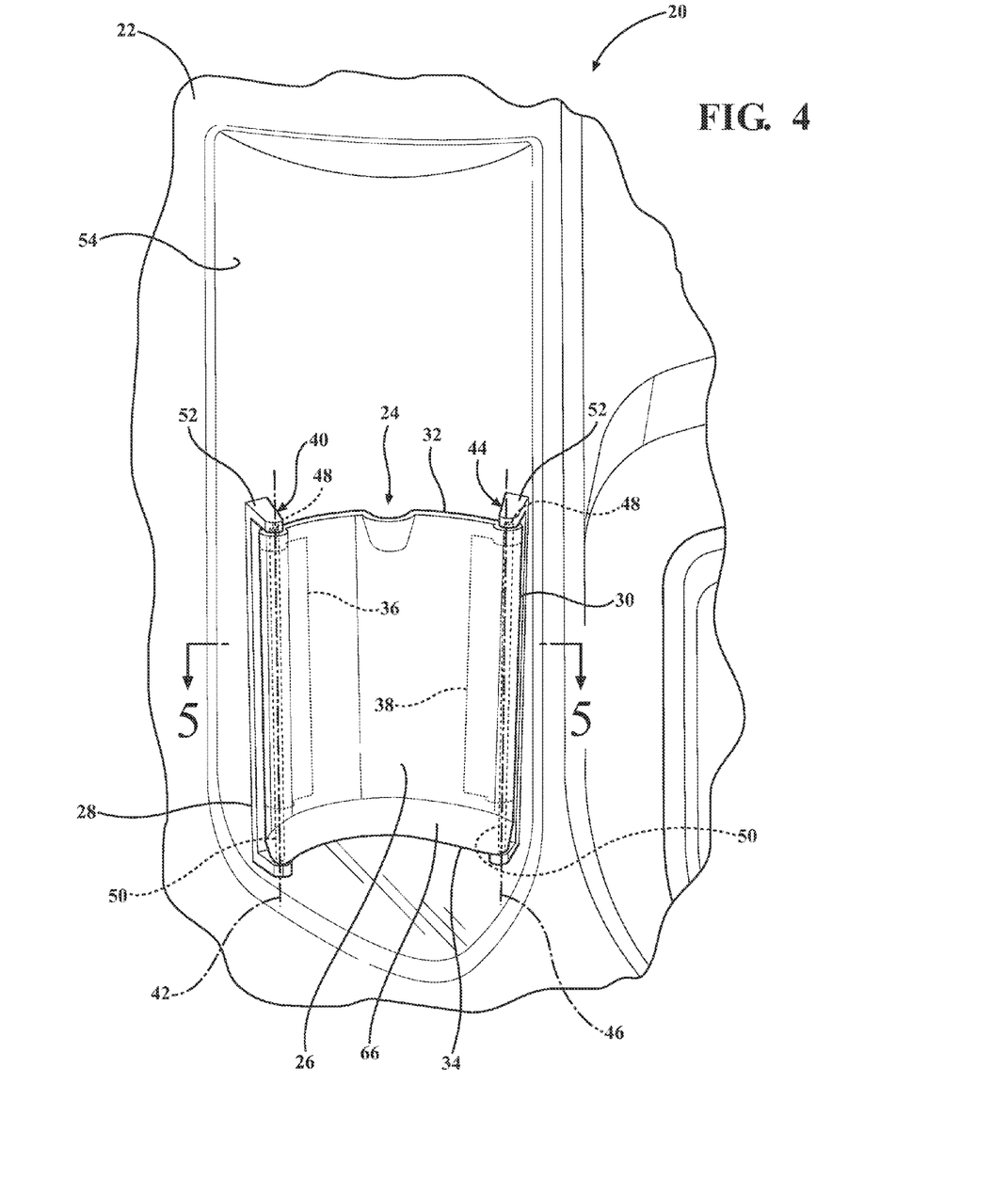
FIG. 4 is a schematic perspective view of the storage assembly in a stowed position.
Figure 5:
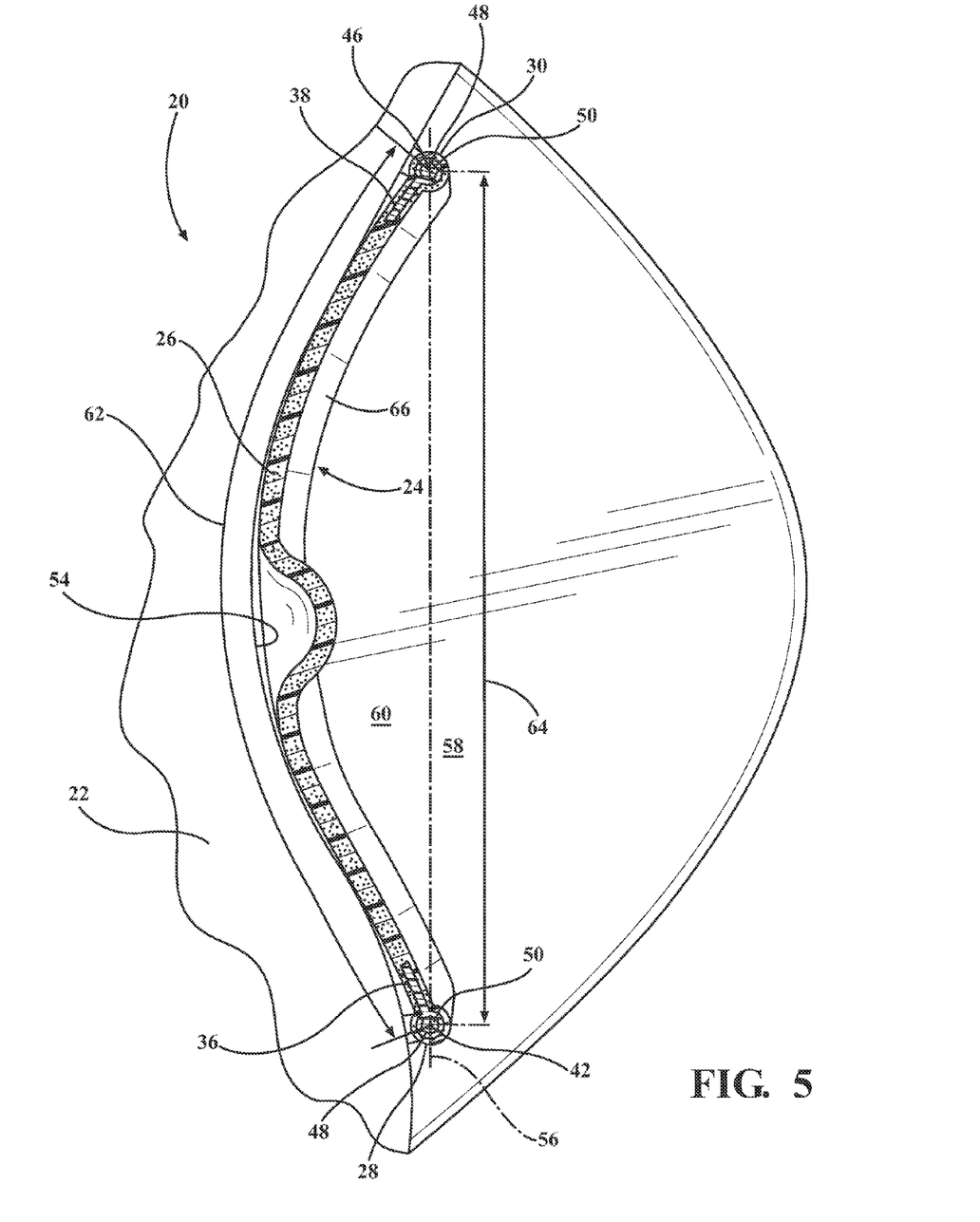
FIG. 5 is a schematic cross sectional view of the storage assembly in the stowed position.

The flexible wall portion 26 is rotatable relative to the first hinge support 40 about the first axis 42, and the second hinge support 44 about the second axis 46, between the stowed position and the deployed position. As noted above, the deployed position is shown in FIGS. 2 and 3, and the stowed position is shown in FIGS. 4 and 5. When disposed in the stowed position, the flexible wall portion 26 is positioned adjacent to the panel 22. When disposed in the deployed position, the flexible wall portion 26 is positioned away from the panel 22 to support the container between the flexible wall portion 26 and the panel 22.

Figure 1:
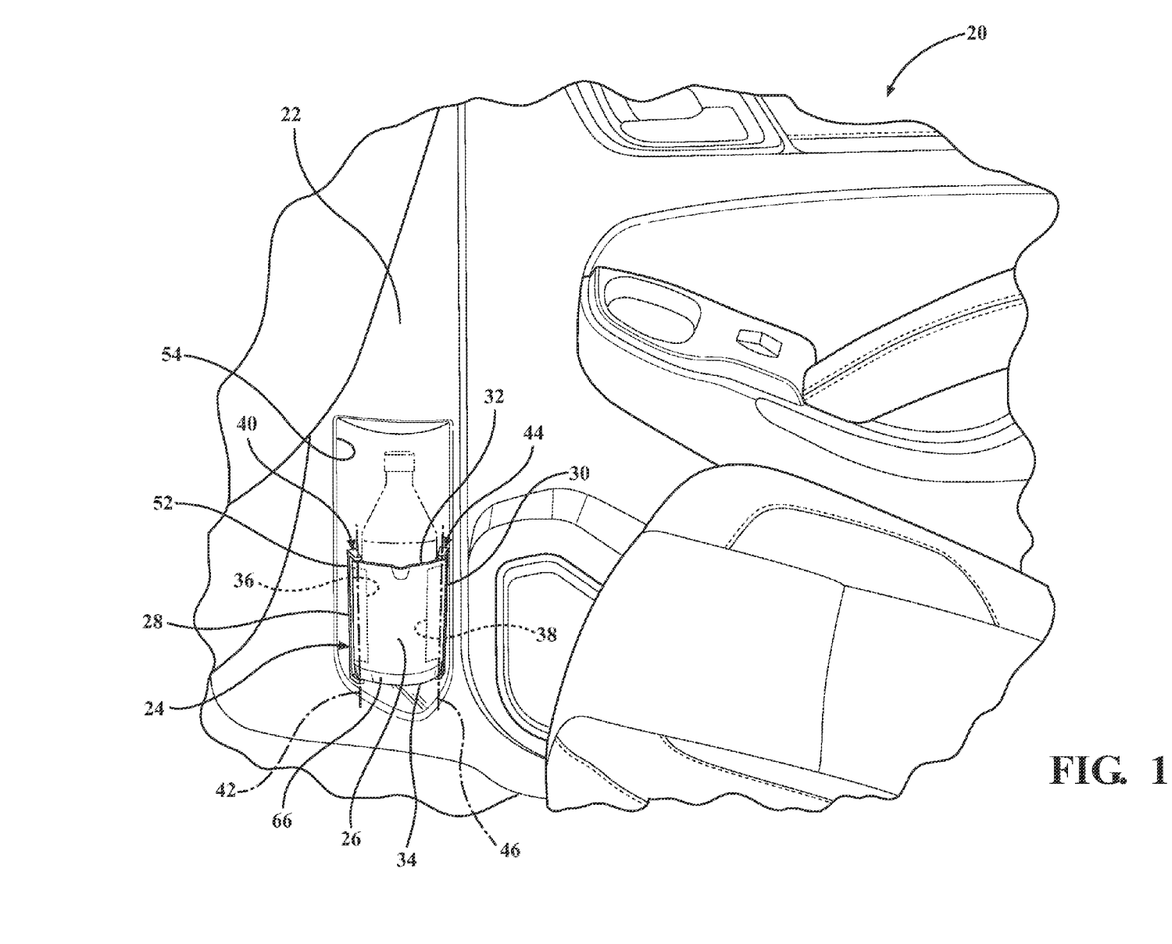
FIG. 1 is a schematic perspective view of a vehicle showing a storage assembly on a trim panel of the vehicle.
Figure 2:
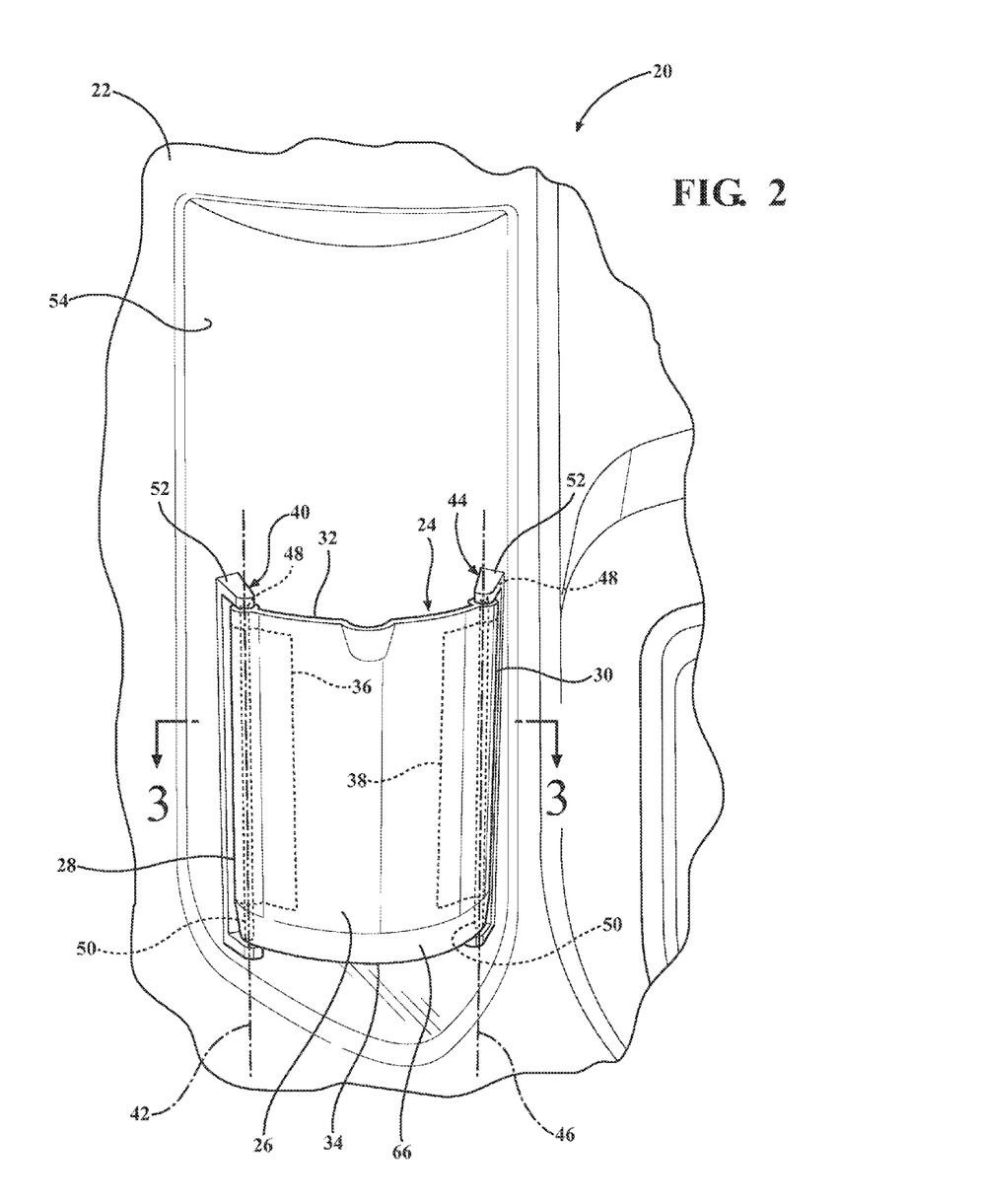
FIG. 2 is a schematic perspective view of the storage assembly in a deployed position.

As shown in the Figures, the panel 22 defines a recess 54. As shown, the recess 54 is located near a vertically lower edge of the panel 22, on a B-pillar of the vehicle 20. The recess 54 reduces intrusion of the panel 22 into the passenger compartment of the vehicle 20, to provide increased room for ingress and egress into and out of the passenger compartment. As shown in FIGS. 2 and 3, the flexible wall portion 26 is not disposed within the recess 54 when the flexible wall portion 26 is disposed in the deployed position. When disposed in the deployed position, the storage assembly 24 and the panel 22 cooperate to support the container therebetween, at least partially in the recess 54 defined by the panel 22. By positioning the storage assembly 24 in the recess 54 of the panel 22, the amount of intrusion into the passenger compartment by the storage assembly 24 is reduced. As shown in FIGS. 4 and 5, the flexible wall portion 26 is disposed within the recess 54 when the flexible wall portion 26 is disposed in the stowed position, so as to not interfere with ingress and egress into and out of the passenger compartment when the storage assembly 24 is not being used to support the container.

The first axis 42 and the second axis 46 are substantially parallel with each other, and extend in a substantially vertical direction, generally parallel with the panel 22. The first edge 28 rotates in a first rotational direction about the first axis 42, and the second edge 30 rotates in a second rotational direction about the second axis 46. The first rotational direction is opposite the second rotational direction. For example, and as shown in the Figures, when the flexible wall portion 26 moves from the deployed position into the stowed position, the first edge 28 of the flexible wall portion 26 rotates in a counterclockwise direction relative to the first hinge support 40 and the first axis 42, and the second edge 30 of the flexible wall portion 26 rotates in a clockwise direction relative to the second hinge support 44 and the second axis 46. In contrast, when the flexible wall portion 26 moves from the stowed position into the deployed position, the first edge 28 of the flexible wall portion 26 rotates in the clockwise direction relative to the first hinge support 40 and the first axis 42, and the second edge 30 of the flexible wall portion 26 rotates in the counterclockwise direction relative to the second hinge support 44 and the second axis 46.

When moved between the deployed position and the stowed position, the flexible wall portion 26 passes through a plane 56 that is defined by the first axis 42 and the second axis 46. As such, when the flexible wall portion 26 is disposed in the deployed position, the flexible wall portion 26 is disposed on a first side 58 of the plane 56, and when the flexible wall portion 26 is disposed in the stowed position, the flexible wall portion 26 is disposed on a second side 60 of the plane 56. The second side 60 of the plane 56 is nearer the panel 22 than the first side 58 of the plane 56.

The flexible wall portion 26 includes a wall width 62 measured on the flexible wall portion 26 between the first edge 28 and the second edge 30 of the flexible wall portion 26. As noted above, the first axis 42 and the second axis 46 are generally parallel with each other, with the first axis 42 and the second axis 46 being spaced a separation distance 64 from each other. Because the flexible wall portion 26 is attached to the first hinge support 40 at the first axis 42, and the second hinge support 44 at the second axis 46, and because the wall width 62 is greater than the separation distance 64, the first edge 28 and the second edge 30 of the flexible wall portion 26 are constrained, and the flexible wall portion 26 is forced to define a curved, non-linear shape between the first edge 28 and the second edge 30, in order to fit between the first hinge support 40 and the second hinge support 44. However, due to the flexible nature of the material forming the flexible wall portion 26, the flexible wall portion 26 may oscillate between the first side 58 and the second side 60 of the plane 56 defined by the first axis 42 and the second axis 46.

When the flexible wall portion 26 is disposed in the deployed position, a cross section of the flexible wall portion 26, viewed perpendicular to both the first axis 42 and the second axis 46, defines a concave cross sectional shape relative to the panel 22. When the flexible wall portion 26 is disposed in the stowed position, the cross section of the flexible wall portion 26, viewed perpendicular to both the first axis 42 and the second axis 46, defines a convex cross sectional shape relative to the panel 22. Accordingly, the flexible wall portion 26 changes between a concave cross sectional shape and a convex cross sectional shape, relative to the panel 22, when oscillating between the deployed position and the stowed position.

As noted above, the flexible wall portion 26 includes the top edge 32 and the bottom edge 34, each of which extend between the first edge 28 and the second edge 30. The bottom edge 34 defines a lip 66 that is angled relative to the majority of the flexible wall portion 26, which defines the substantially vertical wall of the storage assembly 24. The bottom edge 34, i.e., the lip 66, is angled inward toward the panel 22, and relative to the substantially vertical flexible wall portion 26, when the flexible wall portion 26 is disposed in the deployed position. Accordingly, when the flexible wall portion 26 is disposed in the deployed position, the lip 66 of the bottom edge 34 helps vertically support a bottom surface of the container. In contrast, the bottom edge 34, i.e., the lip 66, is angled outward away from the panel 22, and relative to the substantially vertical flexible wall portion 26, when the flexible wall portion 26 is disposed in the stowed position, thereby allowing the flexible wall portion 26 to nestle close against the panel 22. The top edge 32 and the bottom edge 34 are not attached to the panel 22, so as to not restrain the movement of the flexible wall portion 26 between the deployed position and the stowed position.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
   a panel;
   a storage assembly attached to the panel, wherein the storage assembly includes:
     a flexible wall portion having a first edge and a second edge;
     a first hinge support interconnecting the panel and the flexible wall portion, and rotatably supporting the first edge of the flexible wall portion for rotation about a first axis; and
     a second hinge support interconnecting the panel and the flexible wall portion, and rotatably supporting the second edge of the flexible wall portion for rotation about a second axis;
   wherein the flexible wall portion is rotatable relative to the first hinge support about the first axis and the second hinge support about the second axis, between a stowed position and a deployed position;
   wherein the flexible wall portion is positioned adjacent the panel when disposed in the stowed position, and wherein the flexible wall portion is positioned away from the panel to support a container between the flexible wall portion and the panel when disposed in the deployed position;
   wherein the flexible wall portion includes a top edge and a bottom edge, with a wall section disposed adjacent the top edge, and with a lip section disposed adjacent the bottom edge;
   wherein the lip section is angled relative to the wall section and inward toward the panel when the flexible wall portion is disposed in the deployed position; and
   wherein the lip section is angled relative to the wall section and outward away from the panel when the flexible wall portion is disposed in the stowed position.

2. The vehicle set forth in claim 1 wherein the first axis and the second axis are substantially parallel with each other, and extend in a substantially vertical direction.

3. The vehicle set forth in claim 1 wherein the first edge rotates in a first rotational direction about the first axis, the second edge rotates in a second rotational direction about the second axis, and wherein the first rotational direction is opposite the second rotational direction.

4. The vehicle set forth in claim 1 wherein the storage assembly includes a first core portion attached to the flexible wall portion adjacent the first edge of the flexible wall portion, and interconnects the flexible wall portion and the first hinge support.

5. The vehicle set forth in claim 4 wherein the storage assembly includes a second core portion attached to the flexible wall portion adjacent the second edge of the flexible wall portion, and interconnects the flexible wall portion and the second hinge support.

6. The vehicle set forth in claim 5 wherein the flexible wall portion is a flexible, silicone based material.

7. The vehicle set forth in claim 6 wherein the first core portion and the second core portion are each a substantially rigid, polymer material.

8. The vehicle set forth in claim 7 wherein the flexible wall portion is over-molded onto each of the first core portion and the second core portion.

9. The vehicle set forth in claim 1 wherein a cross section of the flexible wall portion perpendicular to both the first axis and the second axis defines a concave cross sectional shape relative to the panel when the flexible wall portion is disposed in the deployed position, and wherein the cross section of the flexible wall portion perpendicular to both the first axis and the second axis defines a convex cross sectional shape relative to the panel when the flexible wall portion is disposed in the stowed position.

10. The vehicle set forth in claim 9 wherein the flexible wall portion includes a wall width measured on the flexible wall portion between the first edge and the second edge of the flexible wall portion, and wherein the first axis and the second axis are spaced a separation distance from each other, with the wall width being greater than the separation distance.

11. The vehicle set forth in claim 1 wherein the panel defines a recess, the flexible wall portion is disposed within the recess when the flexible wall portion is disposed in the stowed position, and wherein the flexible wall portion is not disposed within the recess when the flexible wall portion is disposed in the deployed position.

12. The vehicle set forth in claim 1 wherein the bottom edge is not attached to the panel, and extends between the first edge and the second edge.

13. The vehicle set forth in claim 12 wherein the top edge extends between the first edge and the second edge, and is not attached to the panel.

14. A storage assembly for a vehicle, the storage assembly comprising:
a flexible wall portion having a first edge and a second edge, and formed from a flexible, silicone based material;
a first core portion attached to the flexible wall portion adjacent the first edge of the flexible wall portion, and formed from a substantially rigid polymer material;
a first hinge support attached to the first core portion and rotatably supporting the first edge of the flexible wall portion for rotation about a first axis, and configured for attachment to an interior trim panel of the vehicle;
a second core portion attached to the flexible wall portion adjacent the second edge of the flexible wall portion, and formed from a substantially rigid polymer material; and
a second hinge support attached to the second core portion and rotatably supporting the second edge of the flexible wall portion for rotation about a second axis, and configured for attachment to the interior trim panel;
wherein the flexible wall portion is rotatable relative to the first hinge support about the first axis and the second hinge support about the second axis, between a stowed position and a deployed position;
wherein the flexible wall portion is positioned adjacent the interior trim panel when disposed in the stowed position, and wherein the flexible wall portion is positioned away from the interior trim panel to restrain a container between the flexible wall portion and the interior trim panel when disposed in the deployed position;
wherein the flexible wall portion includes a top edge and a bottom edge, with a wall section disposed adjacent the top edge, and with a lip section disposed adjacent the bottom edge;
wherein the lip section is angled toward a first side of the wall section when the flexible wall portion is disposed in the deployed position; and
wherein the lip section is angled toward a second side of the wall section when the flexible wall portion is disposed in the stowed position.

15. The storage assembly set forth in claim 14 wherein the flexible wall portion is over-molded onto each of the first core portion and the second core portion.

16. The storage assembly set forth in claim 15 wherein a cross section of the flexible wall portion perpendicular to both the first axis and the second axis defines a concave cross sectional shape relative to the panel when the flexible wall portion is disposed in the deployed position, and wherein the cross section of the flexible wall portion perpendicular to both the first axis and the second axis defines a convex cross sectional shape relative to the panel when the flexible wall portion is disposed in the stowed position.

17. The storage assembly set forth in claim 16 wherein the flexible wall portion includes a wall width measured on the flexible wall portion between the first edge and the second edge of the flexible wall portion, and wherein the first axis and the second axis are spaced a separation distance from each other, with the wall width being greater than the separation distance.

18. The storage assembly set forth in claim 14 wherein the flexible wall portion passes through a plane defined by the first axis and the second axis when moved between the deployed position and the stowed position, such that the flexible wall portion is disposed on a first side of the plane when the flexible wall portion is disposed in the deployed position, and wherein the flexible wall portion is disposed on a second side of the plane when the flexible wall portion is disposed in the stowed position.

* * * * *